(12) United States Patent
Bravo et al.

(10) Patent No.: US 10,422,112 B2
(45) Date of Patent: Sep. 24, 2019

(54) MODULAR APPARATUS FOR WATER PRODUCTION

(71) Applicant: SEAS SOCIÉTÉ DE L'EAU AÉRIENNE SUISSE SA, Lugano (CH)

(72) Inventors: Rinaldo Bravo, Cernobbio (IT); Luca Dal Canto, Cernobbio (IT)

(73) Assignee: SEAS SOCIÉTÉ DE L'EAU AÉRIENNE SUISSE SA, Lugano (CH)

( * ) Notice: Subject to any disclaimer, the term of this patent is extended or adjusted under 35 U.S.C. 154(b) by 0 days.

(21) Appl. No.: 15/574,147

(22) PCT Filed: May 15, 2015

(86) PCT No.: PCT/IB2015/000709
§ 371 (c)(1),
(2) Date: Nov. 14, 2017

(87) PCT Pub. No.: WO2016/185236
PCT Pub. Date: Nov. 24, 2016

(65) Prior Publication Data
US 2018/0127955 A1    May 10, 2018

(51) Int. Cl.
*E03B 3/28*    (2006.01)
*B01D 5/00*    (2006.01)

(52) U.S. Cl.
CPC .............. *E03B 3/28* (2013.01); *B01D 5/0039* (2013.01); *Y02A 20/109* (2018.01)

(58) Field of Classification Search
CPC combination set(s) only.
See application file for complete search history.

(56) References Cited

U.S. PATENT DOCUMENTS

| | | |
|---|---|---|
| 2002/0189273 A1 | 12/2002 | Tani et al. |
| 2005/0097901 A1* | 5/2005 | Hutchinson .......... B01D 5/0039 62/93 |
| 2011/0048039 A1 | 3/2011 | Kohavi et al. |

FOREIGN PATENT DOCUMENTS

WO    2014140706 A1    9/2014

* cited by examiner

*Primary Examiner* — Elizabeth J Martin
(74) *Attorney, Agent, or Firm* — Volpe and Koenig, P.C.

(57) ABSTRACT

A modular apparatus for water production from atmospheric air includes: a first parallelepiped module having an inlet opening, an outlet opening, a ventilator, to force an air flow to cross an internal volume of the first module, a condensation unit, located internally of the first module that intercepts the air flow, and a collecting tub for collecting the condensation water; and a second parallelepiped module containing a refrigerating unit including a portion of a refrigerating circuit in which a refrigerating fluid circulates and an evaporator to cool the air flow inside the condensation unit; the first module and the second module are reciprocally fixed at a respective interconnecting face. The second module having an interconnecting face having a width equal to twice a width of an interconnecting face side of the first module.

18 Claims, 9 Drawing Sheets

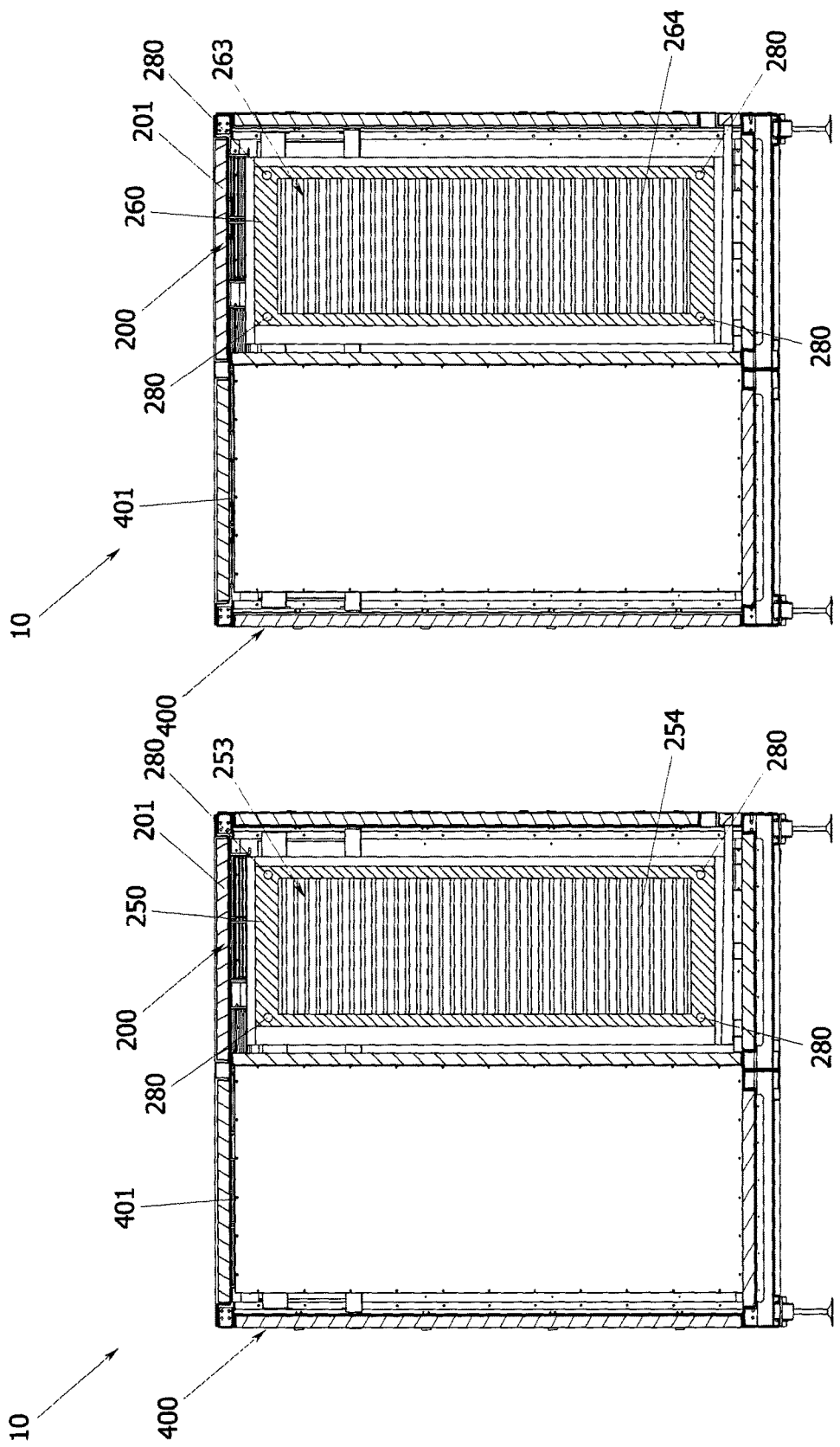

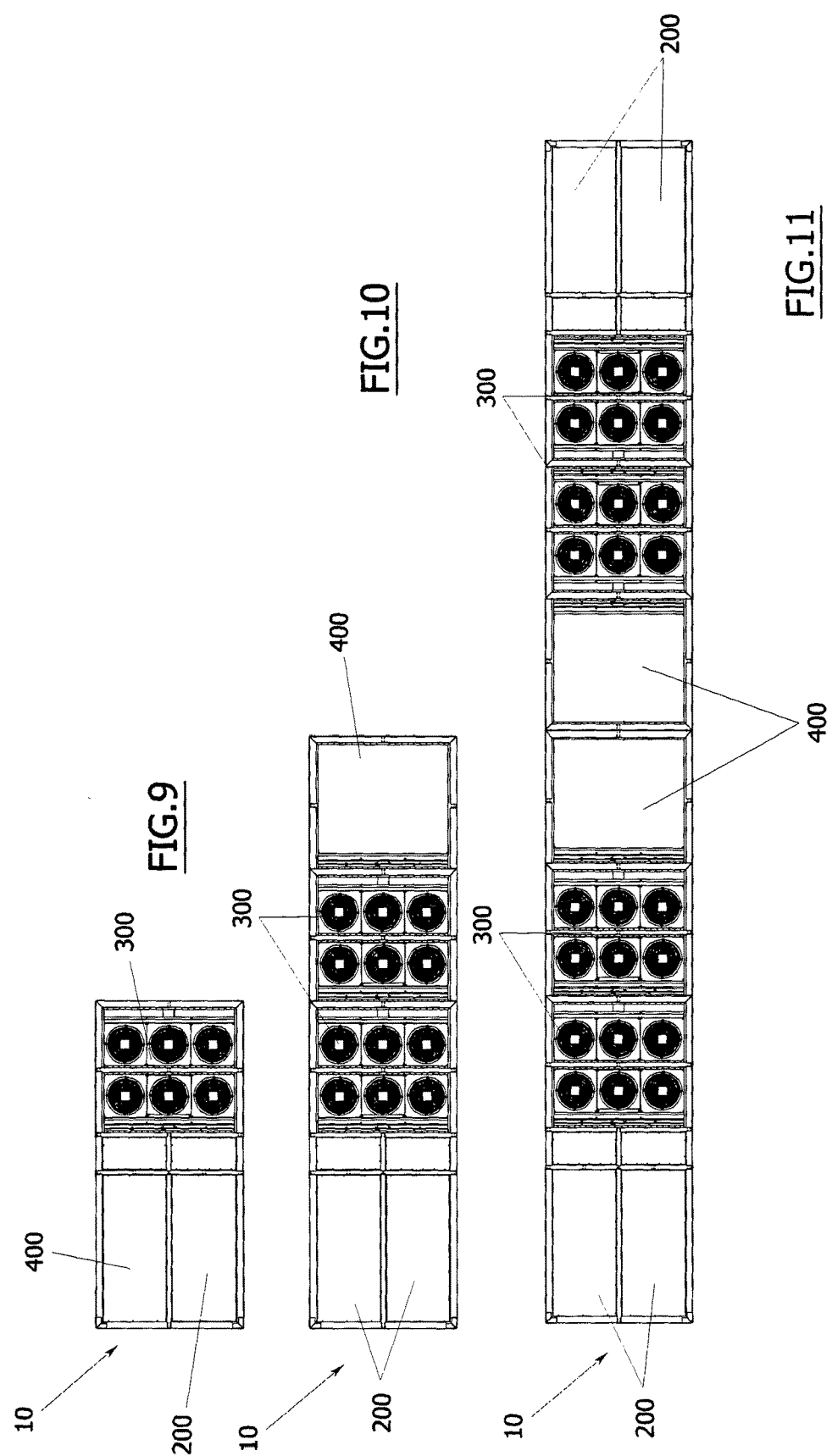

MODULAR APPARATUS FOR WATER PRODUCTION

TECHNICAL FIELD

The present invention relates in general to production of potable water from the atmospheric air, more in particular to an apparatus for production of potable water from atmospheric air loaded with moisture at ambient temperature.

BACKGROUND

As is known, for production of water, for example potable water, in places where the water supply sources are poor or difficult to reach, apparatus are used for obtaining a quantity of water, for example potable water, from dehumidification of the atmospheric air.

These known-type apparatus generally comprise a casing, for example a box casing, in which are arranged, in special predefined spaces, at least a condensation unit able to be crossed by a flow of ambient air, possibly pre-cooled, which is essentially constituted by a heat exchanger defining an evaporator for a cooling fluid circulating in an appropriate refrigerating circuit, provided, apart from with the above-mentioned evaporator, with a condenser thereof and an expansion valve.

Further, there is a place internally of the casing for the motor for activating the compressor and also for a water purification unit of the condensation water produced by the condensation unit.

These apparatus, especially when the water flow rate is of a relevant entity, exhibit a very voluminous casing, which during the design stage and during the assembly stage, must be predisposed for correct and rational positioning of the operating units which enable production of water.

A drawback encountered in these apparatus of known type is that they are poorly flexible to variations of the needs for production capacity of water, for example, once the apparatus has been installed in the workplace, should there be a change in demand of water quantity, for example a demand for double the production of water with respect to what the apparatus was initially designed for, in order to satisfy the new demand it is necessary to completely change the layout of the production units and/or dimension them so that they are contained and rationally arranged internally of a new casing having modified dimensions.

Further, even the realizing of these apparatus requires a greater amount of labor and a design that is customized each time for the most rational and effective arrangement of the production units internally of the casing, with an increase in production costs of the user's plant and, over time, of the amortization costs for the buyer.

Not least, a drawback encountered in the apparatus of known type lies in the fact that it is particularly complicated to transport the apparatus from the place of production to the place of use, the location whereof can sometimes be in difficult places to reach, and where the maneuvering space is substantially small.

An aim of the present invention is to obviate the above-mentioned drawbacks in the prior art, with a solution that is simple, rational and relatively inexpensive.

The aims of the invention are attained by the characteristics recited in the independent claim. The dependent claims delineate preferred and/or particularly advantageous aspects of the invention.

SUMMARY

A modular apparatus (10) for production of water from atmospheric air which comprises:

a first parallelepiped module provided with an inlet opening for moist air, an outlet opening of the dehumidified air, a ventilator, configured such as to force an air flow to cross an internal volume of the first module from the inlet opening to the outlet opening, a condensation unit, located internally of the first module so as to intercept the air flow, and a collecting tub located inferiorly of the condensation unit for collecting the condensation water that is separating from the air flow; and a second parallelepiped module in which a refrigerating unit is contained, provided with at least a portion of a refrigerating circuit in which a coolant fluid circulates, and an evaporator in which the coolant fluid evaporates so as to cool the air flow internally of the condensation unit;

wherein the first module and the second module are fixed to one another at a respective interconnecting face and wherein the second module exhibits a side of the interconnecting face having a width W that is twice a width W/2 of a side of the interconnecting face of the first module.

With this solution, it is possible to configure the apparatus so that the arrangement of the operating units is more rational and efficient with respect to apparatus of known type, with a reduction in production costs which are reflected in the buying cost of the plant of the user and, therefore, in the amortisement time of the apparatus for the buyer.

Further, the times and costs of labor for assembly of the apparatus are greatly reduced, and the transportation costs of the apparatus are optimized.

In a further aspect of the invention, the outlet opening is realized at the interconnecting face of the first module and the inlet opening can be made at an opposite face to the interconnecting face of the first module.

With this solution, the dehumidified and cold air that exits the first module is forced to enter directly into the second module, contributing, for example, to optimizing the functioning of the refrigerating circuit, for example contributing to the cooling of the condenser of the refrigerating circuit.

In a first embodiment of the invention, the apparatus can comprise a third parallelepiped module in which a water purification unit of the condensed water is contained, configured so as to source the water from the collecting tube, wherein the third module and the second module are fixed to one another at a respective interconnecting face and wherein the second module exhibits a side of the interconnecting face having a width W that is twice a width W/2 of a side of the interconnecting face of the third module.

With this solution, the apparatus can produce potable water and at the same time the arrangement of the operating unit of the layout of the apparatus is optimized.

For the same aims illustrated above, a contiguous face to the interconnecting face of the third module is further provided with a side exhibiting a length L equal to a length L of a side of a contiguous face to the interconnecting face of the first module, the first module and the second module being reciprocally flanked and fixed by means of the respective contiguous faces.

In a further embodiment of the invention, the apparatus can comprise a third parallelepiped module in which a water purification unit of the condensed water is contained, configured so as to source the water from the collecting tube, wherein the third module and the second module are fixed to one another at a respective interconnecting face and wherein the second module exhibits a side of the interconnecting face having a width W that is equal to the width W of a side of the interconnecting face of the third module.

With this solution, the apparatus can produce potable water and at the same time the arrangement of the operating unit of the layout of the apparatus is optimized.

In this further embodiment, for example, the apparatus can comprise a pair of the first modules flanked and fixed reciprocally by means of a respective contiguous face to the interconnecting face, respectively fixed to the interconnecting face of a second module of a pair of the second modules fixed to one another by means of an opposite face with respect to the respective interconnecting face.

With this solution, the water flow rate produced by the apparatus can be double with respect to the flow rate produced by the embodiment described in the foregoing, while maintaining a rational and compact apparatus layout.

In a variant of the above-described further embodiment, for example, the apparatus can comprise two of the pairs of the first modules and two of the pairs of the second modules, wherein the access openings of the first modules of a first pair of first modules are symmetrically opposite the access openings of the first modules of the second pair.

With this solution, the water flow rate produced by the apparatus can be double with respect to the flow rate produced by the first variant of the further embodiment described in the foregoing, while maintaining a rational and compact apparatus layout.

In both the variants of the further embodiment, the refrigerating unit of each of the second modules is provided with a respective branch able to cross a respective condensation unit located in a first module of the first modules.

In both the variants of the further embodiment, the outlet openings of one or the first modules comprises an accelerator element of the dehumidified air flow which exits from the outlet opening.

In this way the dehumidified and cold air that exits from each first module can reach the respective second module, even when the second module is further away.

A pair of heat exchangers, of which a first heat exchanger and a second heat exchanger, are advantageously contained in each first module, respectively located upstream and downstream of the condensation unit in the crossing direction thereof by the air flow, the pair of heat exchangers being connected by means of a hydraulic circuit comprising a recycling pump of a liquid contained in the hydraulic circuit.

With this solution, the air entering from the inlet opening and directed to the heat exchange plate can be pre-cooled, before arriving at the heat exchange plate, making the production of water thereby more efficient; further, the cold air exiting from the heat exchange plane crosses the second heat exchanger, which has the double function of rendering heat to the dehumidified air, so as to keep the liquid contained in the hydraulic circuit at a low temperature, and to function as a coalescent membrane for the small drops of condensation water transported by the air flow beyond the heat exchange plate.

The refrigerating circuit advantageously comprises a compressor of the cooling fluid moved by a motor, a condenser of the cooling fluid located downstream of the compressor in the circulating direction of the cooling fluid in the refrigerating circuit, an expansion valve located downstream of the condenser, and the evaporator of the cooling fluid.

The condensation unit, preferably the heat exchange plate, is the evaporator of the refrigerating circuit.

Further, with the aim of improving the layout of the apparatus, the condenser can comprise a dissipating fan located on an upper face of the second module, one of the lateral faces contiguous to the interconnecting face of the second module exhibiting an access opening for the ambient air.

The size of the access opening, the ventilator and the dissipating fan are advantageously configured so as to define an air mixture substantially comprising $2/3$ of ambient air entering the second module from the access opening and $1/3$ of dehumidified air entering the second module by means of the ventilator.

With this air ratio in inlet to the second module, the performance of the refrigerating unit can be optimized.

The motor is advantageously an electric motor.

With this solution the noise level of the apparatus can be reduced and, for example, it is possible to electrically supply the motor by means of photovoltaic panels, with undoubted advantages in economic terms.

The first module can be provided with a filter able to intercept the inlet opening.

For example the purification unit can comprise at least an anti-particulate filter and a mineralizer.

BRIEF DESCRIPTION OF THE DRAWINGS

Further characteristics and advantages of the invention will emerge from a reading of the following description, provided by way of non-limiting example with the aid of the figures illustrated in the appended tables of drawings.

FIG. 6 is a section view along line VI-VI of FIG. 3.

FIG. 7 is a section view along line VII-VII of FIG. 3.

FIG. 9 is a view from above of FIG. 1.

FIG. 10 is an view from above of a second embodiment of the apparatus according to the invention.

FIG. 11 is a view from above of a third embodiment of the apparatus according to the invention.

DETAILED DESCRIPTION OF THE PREFERRED EMBODIMENTS

Figure 1:
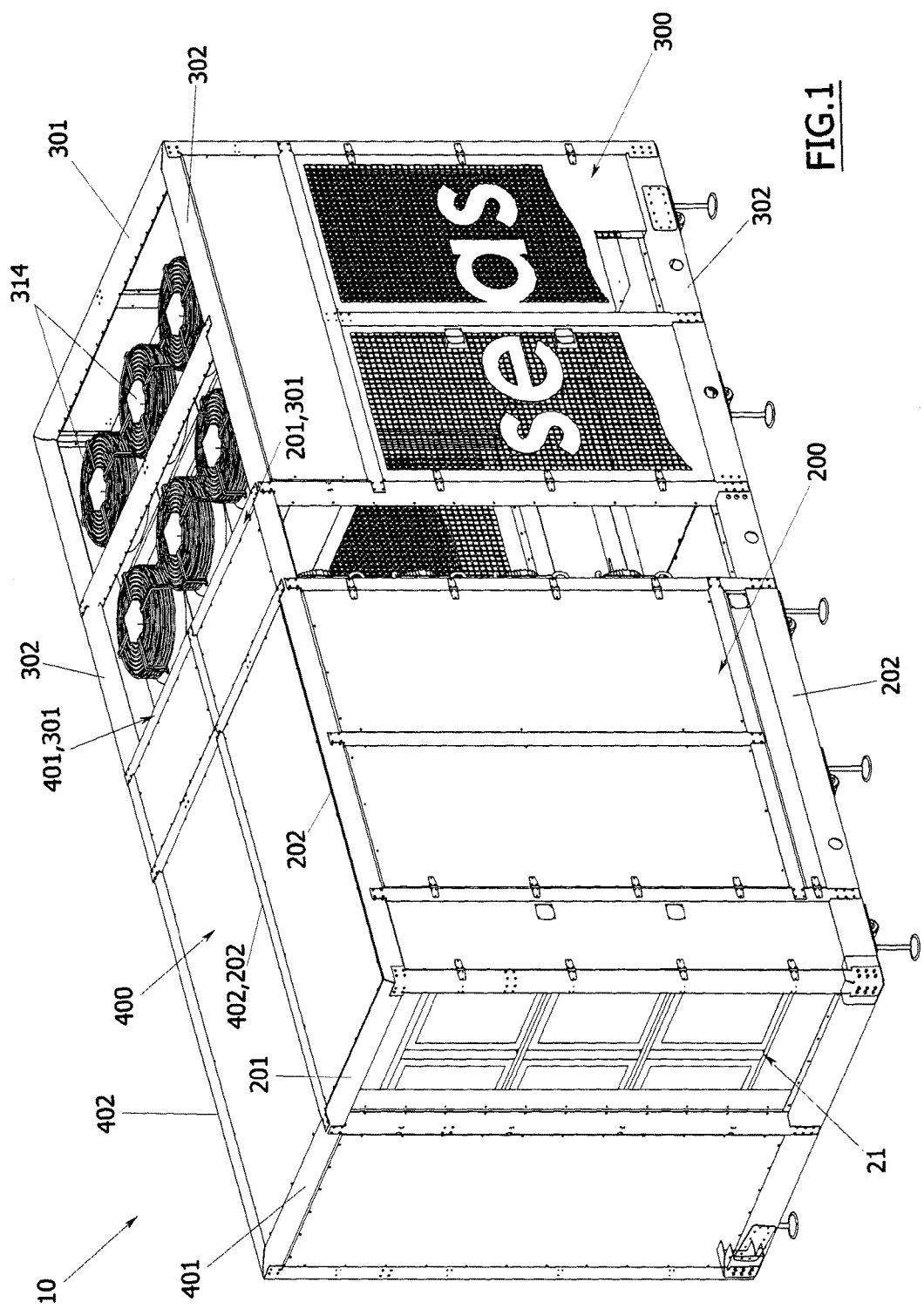
FIG. 1 is an axonometric view of a first embodiment of an apparatus according to the invention.
Figure 2:
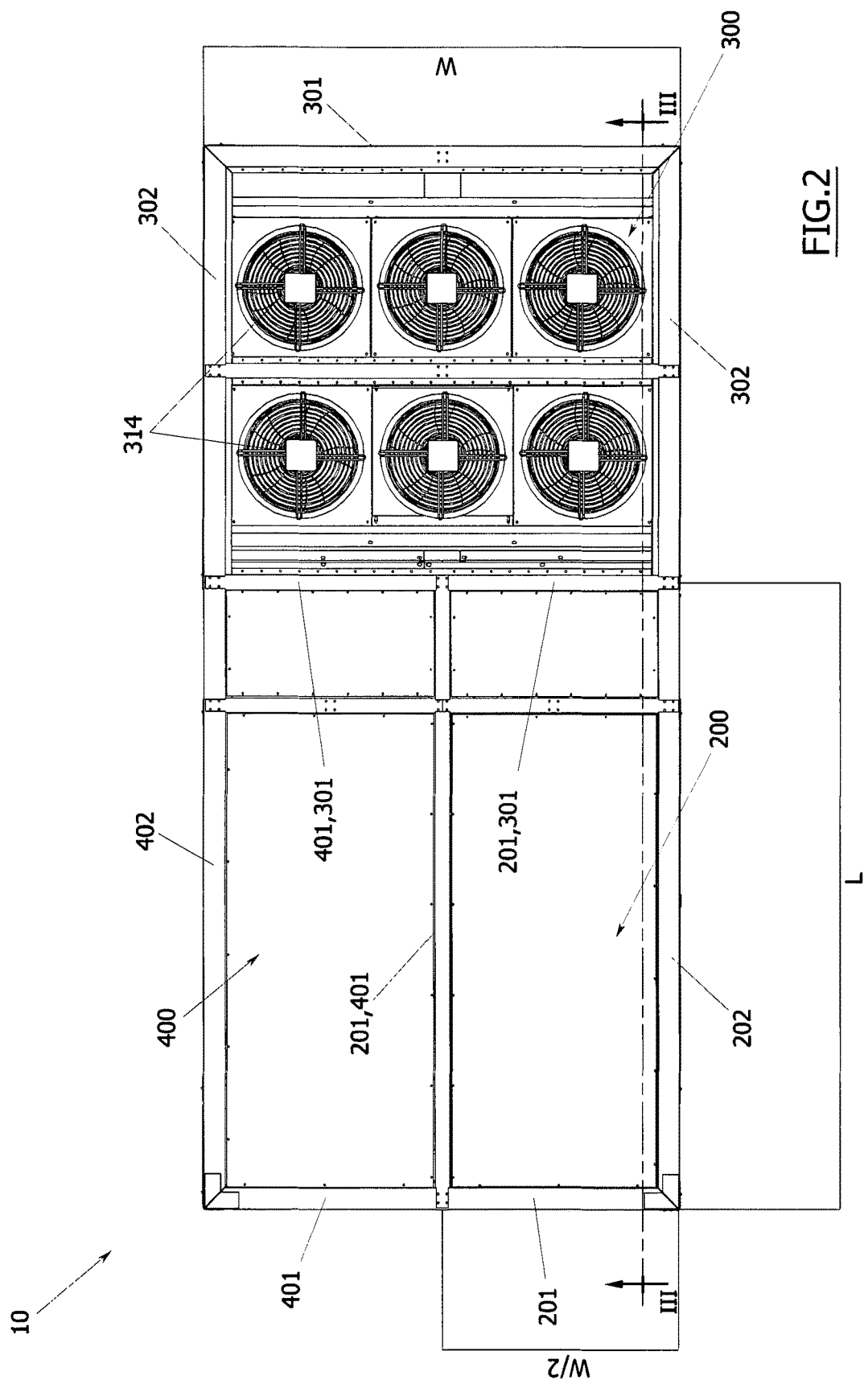
FIG. 2 is a view from above of FIG. 1.
Figure 3:
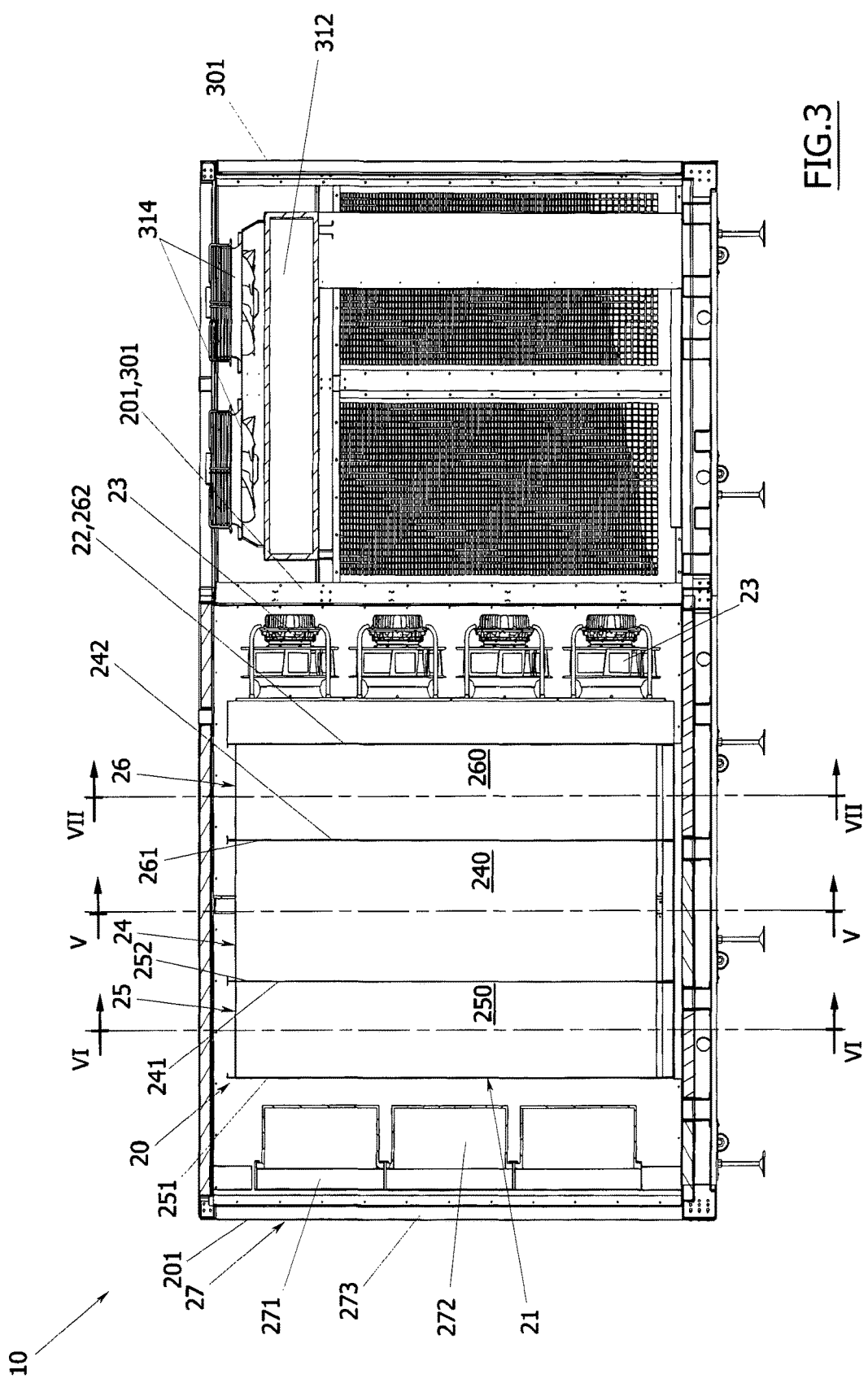
FIG. 3 is a section view along line III-III of FIG. 2.

With particular reference to the figures, reference numeral 10 denotes in its entirety an apparatus for production of water, for example potable water, from the atmospheric air laden with moisture, which is able to obtain a quantity of water by condensation of the moisture present in the atmospheric air. The apparatus 10 is able, for example, to obtain from 2.5 m$^3$ of water a day to 10.0 m$^3$ of water a day, in standard atmospheric conditions, i.e. at ambient temperature of 30° C. and relative humidity of 70%.

The apparatus 10 comprises a condensation unit 20 configured for condensing a quantity of water present in the atmospheric air.

The condensation unit 20 comprises an inlet opening 21 in which the moist air to be dehumidified enters, and an opposite outlet opening 22 from which the dehumidified air exits.

The condensation unit 20 comprises at least a ventilator 23, which for example is located at the outlet opening 22, and is configured so as to force an air flow to enter through the inlet opening 21 and exit from the outlet opening 22.

The condensation unit 20 comprises a heat exchange plate 24, which is interposed between the inlet opening 21 and the outlet opening 22, so as to intercept the air flow and able to be crossed by the air flow.

The heat exchange plate 24 comprises a first parallelepiped body 240 arranged with the main dimension vertical and provided with a front face 241, with respect to the advancement direction of the air flow from the inlet opening 21 to the outlet opening 22, and an opposite rear face 242.

The front face 241 and the rear face 242 are for example rectangular with a vertical longitudinal axis.

Between the front face 241 and the rear face 242 the first parallelepiped body 240 defines a through-channel 243 that is open at the faces 241,242, which crosses the first parallelepiped body 240 in the direction, perpendicular to the faces 241, 242, that the ventilator 23 imposes on the air flow entering from the inlet opening 21. The through-channel 243 is closed in the transversal direction (laterally, inferiorly and superiorly), so that the air flow can be directed only in the longitudinal direction along the through-channel, entering the first parallelepiped body 240 itself from the front face 241 and exiting therefrom only from the rear face 242.

The first parallelepiped body 240 is crossed transversally, with respect to the crossing direction of the air flow imposed by the ventilator 23, by a first tube bundle 244, for example bent in a serpentine shape so as to cross the whole transversal section of the first parallelepiped body 240 several times and, for example, extending over the whole height and for the whole thickness thereof. In this way, the first tube bundle 244 is lapped by the air flow crossing the heat exchange plate 24.

The first parallelepiped body 240, like the tube bundle 244, is made of a metal material having high heat conductivity and being resistant to oxidation, such as for example stainless aluminum, of a type suitable for use with food.

The condensation unit 20 comprises a pair of heat exchangers 25,26, which are interposed between the inlet opening 21 and the outlet opening 22 and are able to be crossed in series by the air flow which is forced by the ventilator 23.

In practice, the condensation unit 20 comprises a first exchanger 25 located upstream of the heat exchange plate 24, in the crossing direction thereof by the air flow, and a second exchanger 26, located downstream of the heat exchange plate 24.

The heat exchange plate 25,26 comprises a second parallelepiped body 250,260 arranged with the main dimension vertical and provided with a respective front face 251,261, with respect to the advancement direction of the air flow from the inlet opening 21 to the outlet opening 22, and an opposite rear face 252,262.

Each front face 251, 252 and each rear face 252, 262, is for example rectangular, with the longitudinal axis vertical and having a like shape to the faces 241, 242 of the first parallelepiped body 240.

Between the front face 251,261 and the rear face 252,262 of each second parallelepiped body 250,260 are defined respective through-channels 253,263 (entirely alike to the ones shown in the first parallelepiped body 240), which are open at the faces 251,252, 261,262 and cross the respective second parallelepiped body in the direction, perpendicular to the faces, that the ventilator 23 imposes on the air flow entering from the inlet opening 21. The through-channels 243 are closed in the transversal direction (laterally, inferiorly and superiorly), so that the air flow can be directed only in the longitudinal direction along the through-channels 253, 263, crossing each second parallelepiped body 250,260 entering the second parallelepiped body 250, 260 from the front face 251,261 and exiting therefrom only from the rear face 252,262.

Each second parallelepiped body 250,260, is for example made of a metal material having high heat conductivity and being resistant to oxidation, such as for example stainless aluminum, of a type suitable for use with food.

The inlet opening 21 of the condensation unit 20 is defined by the front face 251 of the second parallelepiped body 250 which defines the first exchanger 25 and the outlet opening 22 is defined by the rear face 262 of the second parallelepiped body 260 defining the second exchanger 26.

The condensation unit 20 further comprises a filter apparatus 27 which, located so as to intercept the inlet opening 21 and occupying all the air passage surface, is able to be crossed by the whole moist air flow which enters the inlet opening 21, i.e. in the front face 251 of the second parallelepiped body 250, so as to remove any solid particulate and/or any pollutant and/or any saline residues and/or other impurities.

In the illustrated example, the filter apparatus 27 comprises in particular one or more first filters 271, for example of the anti-particulate type, downstream of which one or more second filters 272 can be present, for example of the rigid pocket type. Upstream of the first filters 271, the filter apparatus 27 can also include the presence of a protection grid 273.

Figure 8B:
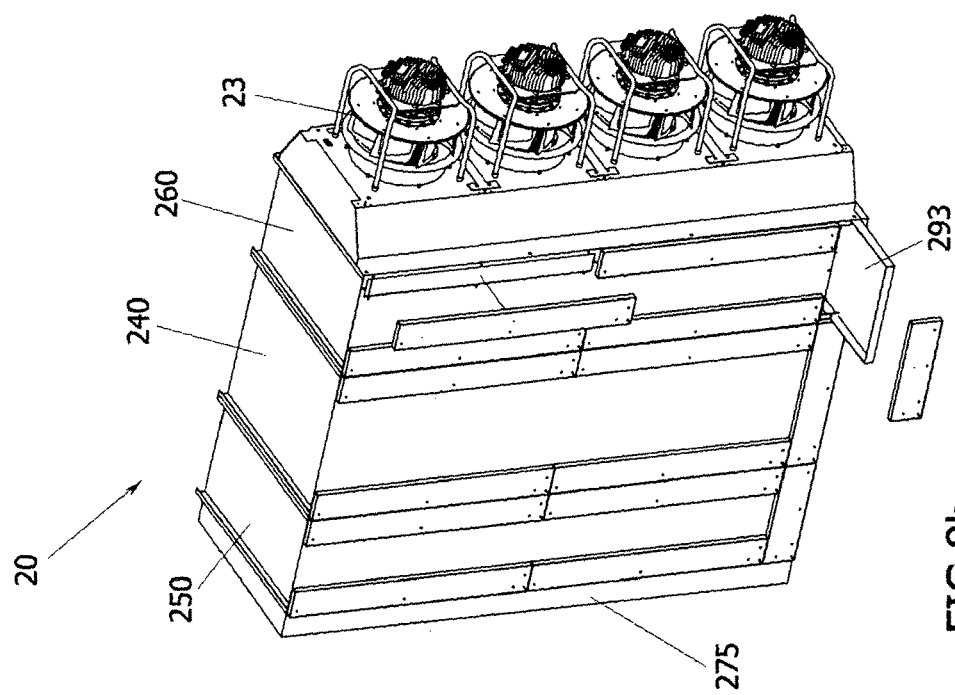
FIG. 8b is an axonometric view of a second embodiment of a condensation unit according to the invention.
Figure 8A:
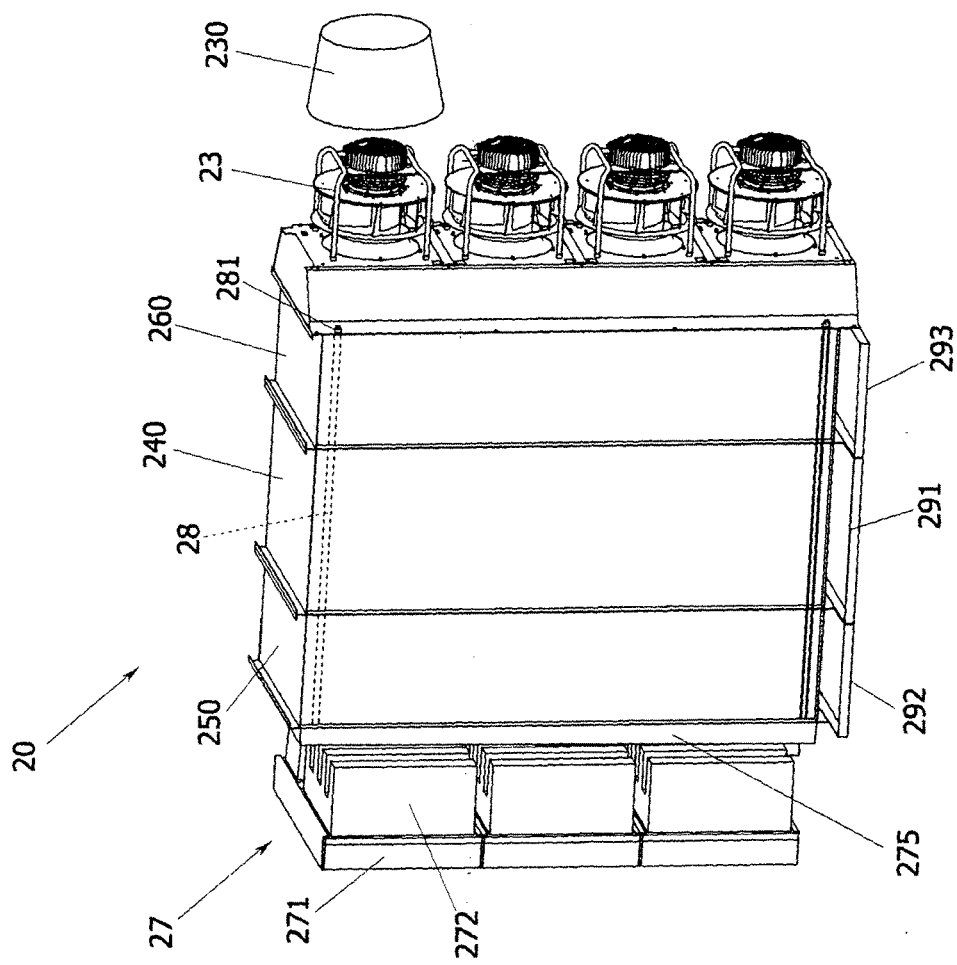
FIG. 8a is an axonometric view of a first embodiment of a condensation unit according to the invention.
Figure 12:
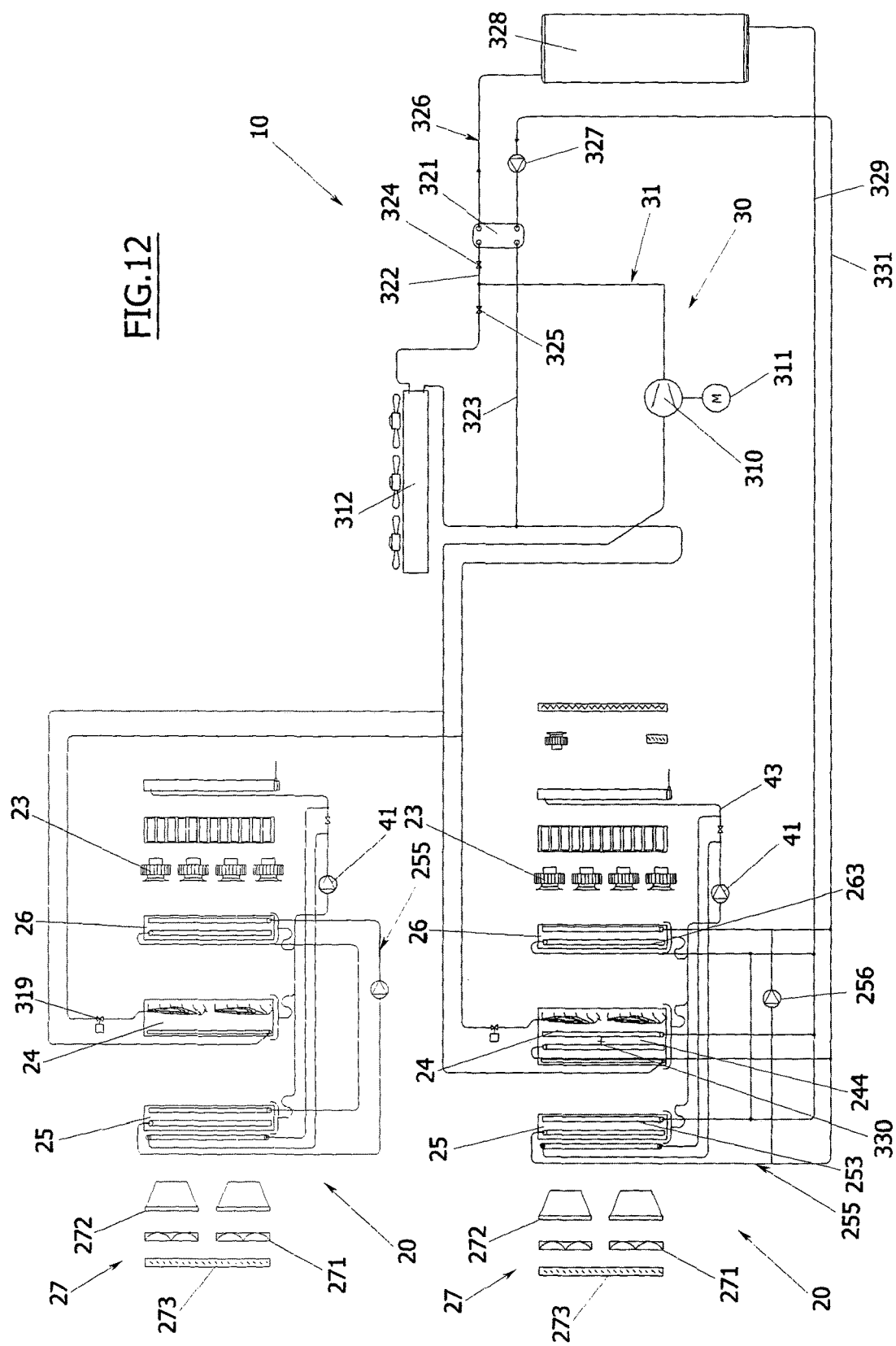
FIG. 12 and FIG. 13 are hydraulic diagrams of the apparatus according to the invention.
Figure 13:
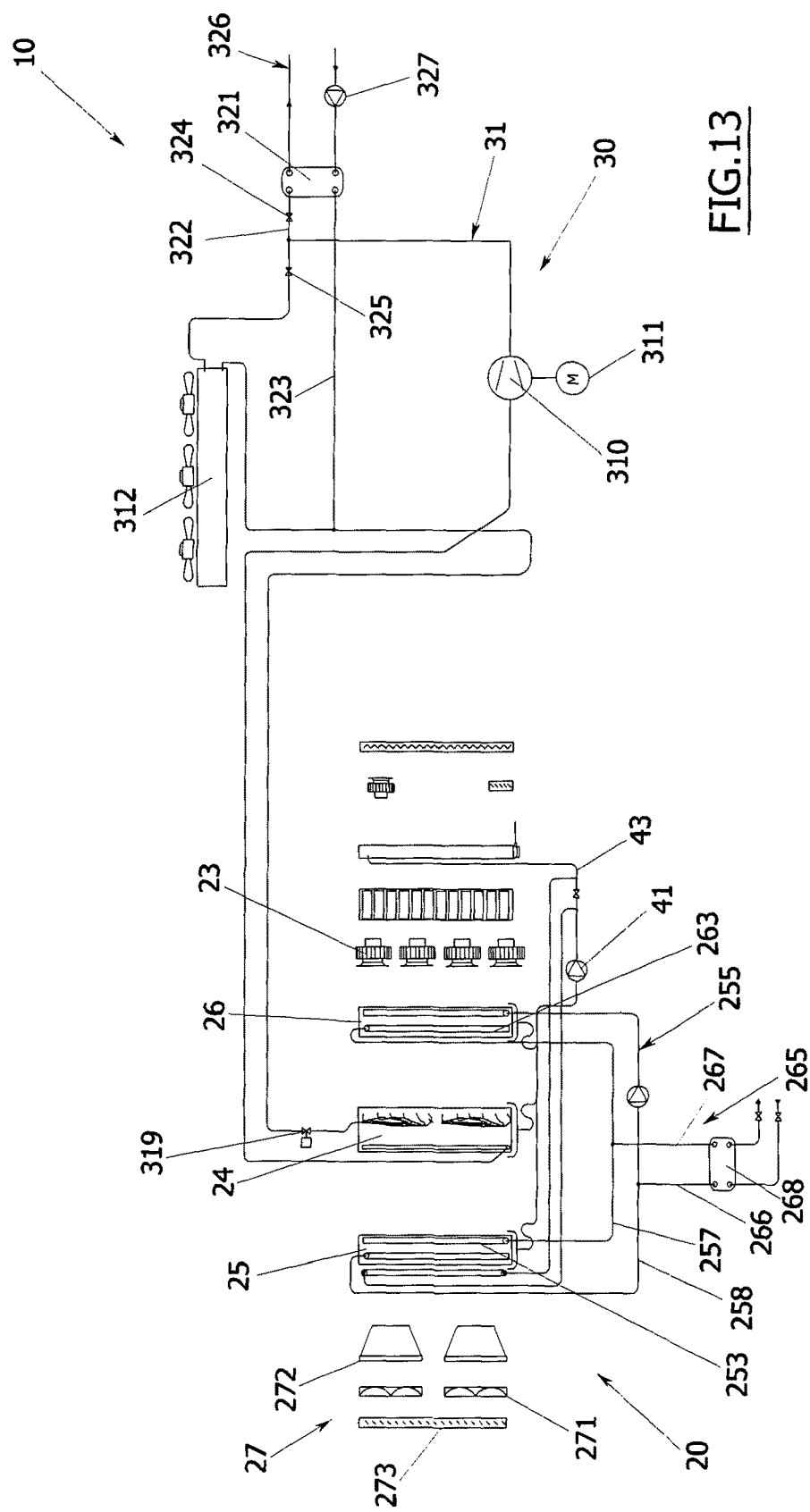

A chemical air treatment unit 275 can be included between the filter apparatus 27 and the condensation unit 20, as illustrated in FIGS. 8*a* and 8*b*.

This chemical treatment unit 275 is useful as the ambient air can contain contaminants having variable composition both in terms of the natural climatic and biological alterations (organic putrefaction, volcanic eruptions etc.) and due to the anthropic presence deriving from civic and industrial activity such as extraction industries, petro plants, craft workshops and agricultural activities (animal husbandry or use of fertilizers, disinfectants, phyto-pharmaceutical products, herbicides, etc.) which cause diffusion of micro-pollutants which are dispersed in the air.

The micro-pollutants can belong to various categories, among which: Ammoniac, Volatile Organic Compounds (hydrocarbons in various forms: Aliphatics, Aromatics, Halogenates, etc.) cations and anions in ionic form or saline form (Potassium, Hydrogen Sulphide, Nitrogen Oxide, etc.) or Aerosols in general containing elements and dissolved molecules belonging to the above-indicated families of compounds.

The chemical treatment unit 275 reduces the concentration of the micro-pollutants before the air flow crosses the condensation unit 20, so that at most a minimal quantity thereof is left in the water, thus facilitating the successive steps of purification and potabilization. In practice, the chemical treatment unit 275 protects and prevents the contamination of the whole condensation unit.

The chemical treatment unit 275 can comprise, for example, an air-permeable membrane, which occludes the inlet 21 of the condensation unit 20 so as to intercept all the air flow directed internally and eliminate the concentration of micro-pollutants.

The permeable membrane can be for example crossed by only Zeolite (for example carbalite and/or phillipsite) so as to realize a step of zeolitic catalysis, or by only activated charcoal, so as to realize an adsorption step of the micropollutants.

Alternatively, the permeable membrane might be made from a mixture of Zeolite and activated charcoal, so as to carry out both steps and obtain a better elimination of the airborne micro-pollutants. Should the presence of contaminants be particularly high, it is possible to include installation in series of one or more permeable membranes made of Zeolite, activated charcoal or mixtures thereof according to the treatments to be made.

In practice, the treatment unit 275 might comprise a container or a series of containers, in box or cylinder form, containing the above-mentioned permeable membranes, which can be arranged parallel to one another in order to be crossed in series by the air flow, and each of which can be composed of or will contain the suitable materials for the treatment to be carried out, i.e. Zeolite, activated charcoal or a mixture thereof. These containers are preferably structured in such a way as to be easily removed from the structure, so that a replacement of the porous membranes can be made with fresh or regenerated ones.

In the example, the heat exchange plate 20 comprises a plurality of ventilators 23 located posteriorly of the rear face 262 of the second heat exchanger 26, with respect to the advancement direction of the air flow from the inlet opening 21 to the outlet opening 22.

The ventilators 23 are such as to occupy the whole passage surface of the air on the rear face 262 of the second exchanger 26, in practice being uniformly distributed with respect to the surface of the rear face itself.

In the example, the ventilators 23 are flanked and aligned to one another along a vertical direction, i.e. along the prevalent extension direction of the outlet opening 22 and of the heat exchange plate 24.

Each second parallelepiped body 250, 260 is crossed transversally, with respect to the crossing direction of the air flow imposed by the ventilator 23, by a respective second tube bundle 254,264, for example bent in a serpentine shape so as to cross the whole transversal section of the second parallelepiped body 240 several times and, for example, extending over the whole height and for the whole thickness thereof. In this way, the second tube bundle 254,264 is sprayed by the air flow crossing the heat exchange 25, 26.

The heat exchangers 25, 26 and in particular the second tube bundles 254, 264 thereof are connected to one another by means of a hydraulic circuit 255 provided with a recycling pump 256 able to recycle a heat exchange liquid, for example water, in the hydraulic circuit 255 and then between the second tube bundles 254, 264. For example, the hydraulic circuit 255 is a closed circuit.

The second tube bundles 254,264, are for example made of a metal material having high heat conductivity and being resistant to oxidation, such as for example stainless aluminum, of a type suitable for use with food.

The hydraulic circuit 255 can comprise a first portion 257 which connects the inlet of the second tube bundle 254 of the first exchanger 25 with the outlet of the second tube bundle 26 and a second portion 258 which connects the outlet of the second tube bundle 254 of the first exchanger 25 with the inlet of the second tube bundle 264 of the second exchanger 26.

In practice, the heat exchange liquid present in the hydraulic circuit 255 circulates, by means of the thrust exerted by the recycling pump 256, and in succession crosses the second tube bundle 264 of the second exchanger 26, where it is cooled by the dehumidified air flow which exits from the heat exchange plate 24, the first portion 257 (cold), the second tube bundle 254 of the first exchanger 25, in which by exchanging heat with the moist air flow it pre-cools the air flow and correspondingly heats up, and the second portion 258 (hot).

In some embodiments it is possible to use the heat of the cold heat exchange liquid circulating in the first portion 257, entirely or only in part (if in a quantity of lower than the total in circulation) for cooling a second liquid of a further hydraulic circuit 265, for example closed, in which the heat exchange liquid circulates, destined to serve a user, for example the water of a cooling plant or the like.

In practice, the further hydraulic circuit 265 comprises a first branch 267, provided with a respective opening and closing valve, which branches from the first portion 257, and a second branch 266, also provided with a respective opening and closing valve, which enters the second portion 258 in an injection point downstream of the branching point of the first branch 267 in the exchange liquid flow direction along the second portion 258.

A heat exchanger can be included between the first branch 267 and the second branch 266, for example of a liquid-liquid type, used for cooling a liquid of an appropriate user.

The heat exchange plate 24, the first heat exchanger 25 and the second heat exchanger 26 are arranged in succession and aligned in a pack, so that the rear face 262 of the second parallelepiped body 260 defines the outlet opening 22 of the condensation unit 20, while the front face 251 of the first parallelepiped body 250 defines the inlet opening 21.

The heat exchange plate 24 is advantageously fixed by means of threaded organs to the pair of heat exchangers 25,26, so as to define a compact sandwich structure.

The threaded organs, for example, can be stud screws 28 having axes parallel to the advancement direction of the air flow from the inlet opening 21 to the outlet opening 22.

In practice, the stud screws 28 exhibit a length only slightly greater than the sum of the thicknesses of the heat exchangers 25,26 and the heat exchange plate 24 and exhibit threaded opposite ends, able to project out of the sandwich structure (see FIG. 8a).

Figure 5:
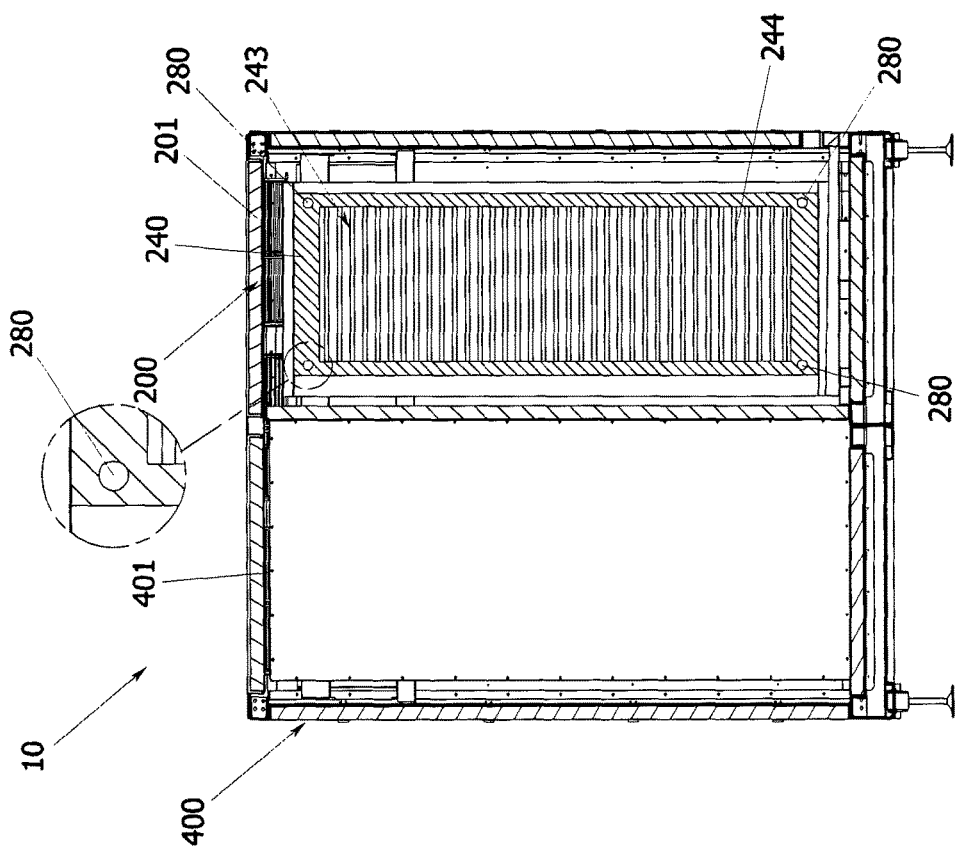
FIG. 5 is a section view along line V-V of FIG. 3.
Figure 4:
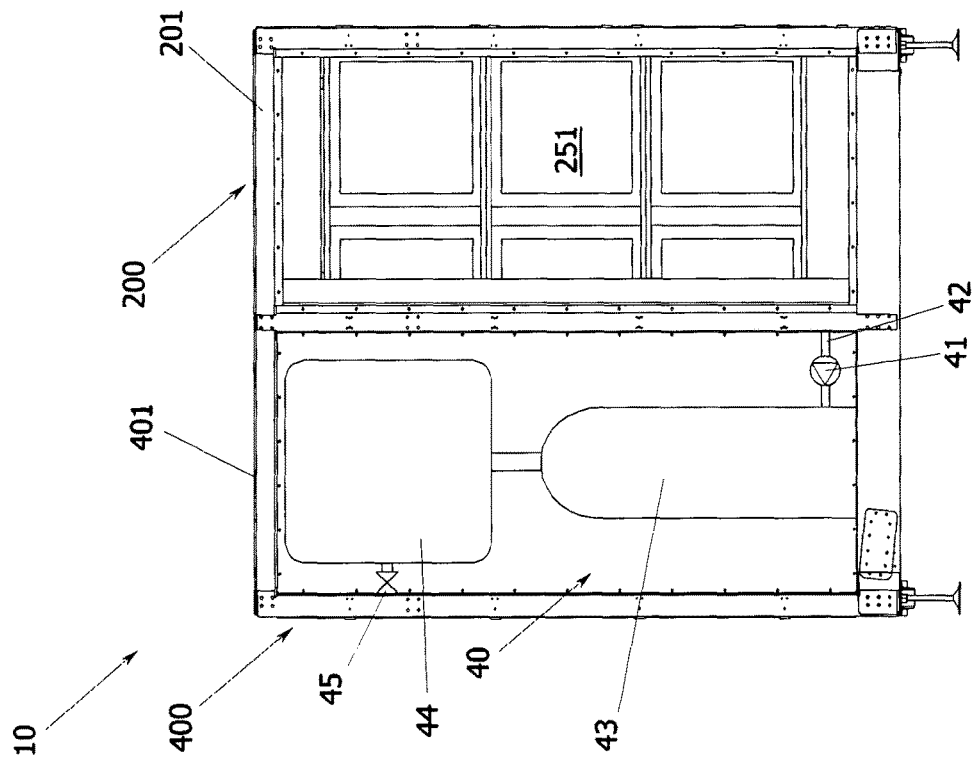
FIG. 4 is a frontal elevation of FIG. 1.

Each stud screw 28 is insertable in a series (in the example four in number located at the vertices of the front faces 241,251,261 and of the rear faces 242,252,262) of through-holes 280 (see figure FIGS. 5-7), for example completed by hollow tubular elements, aligned with one another and realized in the heat exchange plate 24 and in the pair of heat exchangers. The opposite ends of the stud screws 28 are screwed to lock nuts 281 able to block the sandwich pack structure constituted by the heat exchange plate 24 and the pair of heat exchanger 25,26.

Alternatively or additionally, each parallelepiped body 245,250,260 comprises a perimeter flange able to border each of the front faces 241,251,261 and of the rear faces 242,252,262, for example projecting externally of the respective parallelepiped body 240,250,260.

For example, the parallelepiped bodies 240,250,260 can be coupled to one another by means of the respective perimeter flanges, for example solidly (e.g. by welding).

For example, each parallelepiped body 240,250,260 can comprise one or more inspection windows provided with openable and/or removable caps for inspection and periodic cleaning of the parallelepiped bodies 240,250,260 (as shown for example in FIG. 8b).

In practice, the sandwich structure constituted by the first parallelepiped body 240 and by the pair of second parallelepiped bodies 250, 260 defines a tunnel, closed in a transversal direction to the fluid crossing direction imparted by the ventilators 23 and open exclusively at the inlet opening 21 (i.e. the front face 251) and the outlet opening 22 (i.e. the rear face 262).

Downstream of the ventilators 23 an accelerator element of the dehumidified air flow can be fixed, which exits from the outlet opening.

For example, the accelerator element can comprise a converging nozzle 230, i.e. a converging connection provided with a broadened end associated to the downstream end of the ventilator 23 and a free tapered end located downstream of the advancement direction of the air flow, imposed by the same ventilator 23.

The condensation unit 20 further comprises at least a collecting tub 291,292,293 located inferiorly thereof at least at the heat exchange plate 24 for collecting the condensation water separating from the air flow which crosses the heat exchange plate.

For example the condensation unit 20 comprises a plurality of collecting tubs, of which a main tub 291 located inferiorly of the heat exchange plate 24, a first auxiliary tub 292 located inferiorly of the first exchanger 25 and a second auxiliary tub 293 located inferiorly of the second exchanger 26.

The second auxiliary tub 293, notwithstanding the fact that the condensation function of the second exchanger 26 is substantially nil or in any case very small, collects the water that deposits on the second exchanger, as it performs a coalescent function of coalescing and collecting and making the smallest drops of condensate bigger, the said smallest drops being deposited on the first exchanger 25 and/or on the heat exchange plate 24, and being transported by the air flow towards the outlet opening 22, so that once made larger they fall into the second auxiliary tub 293.

Each collecting tub 291,292,293 is slidably associated to the respective parallelepiped body 240,250,260 with respect to a horizontal sliding direction perpendicular to the advancement direction of the air flow along the condensation unit 20.

For example, a sliding guide is included below each parallelepiped body 240,250,260, for example formed by a pair of opposite profiles having a C-shaped transversal section, able to define a sliding coupling with a respective collecting tub.

For example, the connection between the parallelepiped body 240,250,260 and the respective collecting tub 291,292, 293 is made substantially sealed or in any case isolated from outside by means of removable and/or openable padding (shown for example in FIG. 8b).

The bottom of each collecting tub 291,292,293 is inclined with respect to a horizontal plane, so as to make the water converge towards a lowered collection point.

The condensation unit 20 is for example arranged internally of a first parallelepiped module 200, i.e. an imaginary volume having a parallelepiped shape in which the condensation unit 20 is contained.

The first module 200, for example, is bordered by a tubular frame, for example formed by rectangular portals 201 (for example two in number) parallel to one another and joined by at least four longitudinal cross-members 202 parallel to the advancement direction of the air flow imposed by the ventilator 23. For example the cross members 202 are able to join the vertices of the portals 201.

The portals 201 exhibit a vertical longitudinal axis and have a slightly greater dimension with respect to the faces 241,251,261; 242,252,262 of the parallelepiped bodies 240, 250,260.

The two portals 201 are for example parallel to the faces 241,251,261; 242,252,262 of the parallelepiped bodies 240, 250, 260 and, respectively, externally border the front face 251, which defines the inlet opening 21, and the rear face 262 which defines the outlet opening 22.

In practice the rear face of the first module 200, i.e. the face which borders the rear face 262 of the second exchanger 26 and is proximal thereto, defines an interconnecting face of the first module 200, the opposite face to the interconnecting face of the first module 200 (bordered by the front portal 201) borders and is proximal to the front ace 251 of the first exchanger 25 and each contiguous face (for example four in number, of which two lateral, one upper and one lower) to the interconnecting face of the first module 200 is bordered by a pair of cross-members 202 parallel to one another.

The opposite face to the interconnecting face of the first module 200 (and possibly also the interconnecting face itself) is provided with filler sheets able to fill any interspace between the portal 201 and the inlet opening 21 (and, respectively, the outlet opening 22), so that the air flow forced by the ventilator 23 is totally conveyed along the tunnel defined by the sandwich structure of the heat exchangers 25, 26 and the heat exchange plate 24.

Each contiguous face to the interconnecting face can be provided with filler sheets, for example fixed sheets or mobile sheets, for example of a hatch or door type. At least one of the filler sheets closing a contiguous lateral face is advantageously openable for removal of the collecting tubs 291,292,293 along the sliding direction and/or for removing, along the sliding direction, one or more of the parallelepiped bodies 240,250,260 for cleaning or replacing them.

The first module 200 exhibits a width, for example defined by the extension of a short side (horizontal) of the front portal 201, which extension is W/2, in which W is for example a maximum width of the internal compartment of a container of standard dimensions (for example 234 cm), for example transportable by sea.

In the example W is a little smaller than the maximum width of the internal compartment of a container of standard dimensions and preferably is substantially 220 cm.

The length L of the first module 200, in the parallel direction to the advancement direction of the air flow along it, can be greater than the width W.

The apparatus 10 further comprises a refrigerating unit 30.

The refrigerating unit 30 can be based on any known cooling technology, though in the majority of applications a conventional refrigerating compressing cycle of steam will be the sturdiest and most versatile system. For this reason, the refrigerating unit 30 generally comprises a refrigerating circuit 31 in which a refrigerating fluid circulates, for example R-134a, through a compressor 310, a condenser 312, an expansion valve 319 and an evaporator.

The compressor 310 is configured to increase the pressure of the refrigerating fluid to the state of vapor coming from the evaporator. The compressor 310 can be a rotary screw compressor or a compressor of any other type. The compressor 310 is moved by a motor 311, for example by an electric motor connected to an electric distribution grid or a generator. The compressor 310 might also be of type normally called "semi-hermetic", i.e. having an electric motor inserted in the compressor body. It is however possible for the motor 311 to be an internal combustion engine, for example a diesel engine.

The condenser 312 is configured such as to cause condensation of the high-pressure refrigerating fluid coming from the compressor 310, losing heat to the external environment. The condenser 312 can be a tube and/or fin condenser, and can be provided with one or more fans 314 able to create a forced-air flow through the condenser 312, facilitating dissipation of the heat produced by the condensation of refrigerating fluid.

The pressure valve 319 is configured so as to lower the pressure of the refrigerating fluid coming from the condenser 312. The expansion valve 319 can be a fixed-geometry valve or a variable-geometry valve, for example having an electro-mechanical activation. In particular, the expansion valve 319 can be a regulatable valve, for example a thermostatic valve.

The evaporator is configured to cause evaporation of the lower-pressure refrigerating fluid coming from the expansion valve 319, subtracting heat from the surrounding atmosphere.

In the example the evaporator of the refrigerating unit 30 is defined by the heat exchange plate 24 of the condensation unit 20, i.e. by the tube bundle 244, so that the evaporation of the refrigerating fluid can directly cool the environmental air flow to be dehumidified.

In practice, the tube bundle 244 defines a branch of the refrigerating circuit 31 which receives the refrigerating fluid in the liquid state and at low pressure in outlet from the expansion valve 319 and sends it to the vapor state towards the compressor.

As it evaporates internally of the tube bundle 244, the refrigerating fluid cools the air flow which, as it crosses the condensation unit 20, laps the external surface of the tube bundle 244.

It is however possible that in other embodiments the evaporator of the refrigerating unit 30 is separated from the heat exchange plate 24 of the condensation unit 20. For example, the evaporator of the refrigerating unit 30 can be used to cool a vector fluid, for example a mixture of water and glycol, which is circulated by a further pump in an auxiliary hydraulic circuit connected with the heat exchange plate 24. In this way, in the heat exchange plate 24, the air flow is cooled by the vector fluid and not directly by the refrigerating fluid, avoiding contamination of the condensation water in a case of small faults in the heat exchange plates 24.

In other embodiments, the refrigerating unit 30 can also comprise a further evaporator for cooling an air flow internally of a second condensation unit 20 for production of water.

In practice, this further evaporator is the heat exchange plate 24 of a second condensation unit 20 substantially identical to the one described in the foregoing.

The two heat exchange plates 24 of this embodiment can be connected to the refrigerating circuit 31 so as to be arranged reciprocally in parallel with respect to the heat exchange plate 24, i.e. so that the refrigerating fluid circulating in a heat exchange plate 24 does not circulate in the other and vice versa.

The pressure of the refrigerating fluid flowing in the further heat exchange plate 24 is regulated by a further expansion valve 319 located at the inlet of the heat exchange plate 24 of the second condensation unit 20, for example a further thermostatic valve.

This embodiment can be particularly useful in all cases in which the climatic conditions or production needs can require a lower refrigerating power in order to obtain the condensation of the water present in the air. In this case, the second condensation unit 20 can be set in function on reaching a under-exploiting condition of the power the compressor 310 can develop.

In some embodiments, the refrigerating unit 30 can also comprise a second condenser 321 configured so as to enable condensation of the refrigerating fluid coming from the compressor 310. The second condenser 321 can be connected to the refrigerating circuit 31 so as to be arranged in parallel with respect to the first condenser 312, i.e. so that the refrigerating fluid circulating in the second condenser 321 does not circulate in the first condenser 312 and vice versa.

In practice, the second condenser 321 can comprise an inlet for the refrigerating fluid, which is hydraulically connected by means of a branch conduit 322 to a portion of the refrigerating circuit 31 comprised between the outlet of the compressor 310 and the inlet of the first condenser 312 and an outlet for the refrigerating fluid, which is hydraulically connected by means of a delivery conduit 323 to a portion of the refrigerating circuit 31 comprised between the outlet of the first condenser 312 and the inlet of the expansion valve 319.

The flow of refrigerating fluid flowing at the inlet of the second condenser 321 is regulated by an intercept valve 324 located in the branch conduit 322. A further intercept valve 325 can also be positioned in the portion of the refrigerating circuit 31 comprised between the attachment point of the branch conduit 322 and the inlet of the first condenser 312. Each of the intercept valves 324 and 325 can be an electrical actuating valve. Alternatively the two valves 324 and 325 might be replaced by a single valve of the three-way type which exchanges with a single activation.

In the second condenser 321 the refrigerating fluid is in heat exchange relation with a further vector fluid, for example water or a mixture of water and glycol, which circulates in an auxiliary circuit 326 activated by a pump 327. In the illustrated example, the auxiliary circuit 326 comprises a storage tank 328 able to store the vector fluid, while the second condenser 321 is configured as an exchanger (of any type) in which the refrigerating fluid is able to exchange heat with the vector fluid, with no direct contact. In other embodiments, the second condenser 321 might however be configured as a tube bundle immersed directly in the storage tank 328. In other embodiments, the second condenser 321 might be an exchanger in which the refrigerating fluid exchanges heat directly with the air used as a heat vector fluid destined to other uses or to a room to be heated.

In any case the condensation of the refrigerating fluid internally of the second condenser 321 supplies heat to the vector fluid, which therefore heats up. This high-temperature vector fluid can therefore be advantageously used for many purposes.

One of these aims, for example the aim of realizing a defrosting system enabling thawing the ice which in determined functioning conditions that will be more fully clarified in the following, can form in the heat exchange plate 24 of the condensation unit 20, and also in the first and second exchanger 25 and 26.

For this purpose, the auxiliary circuit 326 can comprise a delivery conduit 329 which connects an outlet of the storage tank 328 with the inlet of a further tube bundle 330, formed by one or more tube arrays, which is located internally of the first parallelepiped body 240 of the heat exchange plate 24, between the arrays of the first tube bundle 244. The auxiliary circuit 326 also comprises a return conduit which connects an outlet of the tube bundle 330 with an inlet of the storage tank 328, passing through the pump 327 and the second condenser 321.

To extend the defrosting system also to the heat exchangers 25 and 26, the auxiliary circuit 326 can be hydraulically connected to the hydraulic circuit 255, in such a way that the hot fluid coming from the storage tank 328 can selectively circulate also internally of each of the second tube bundles 254 and 264. In this way, the heat exchange liquid circulating normally between the first and the second exchanger 25 and 26 coincides with the vector fluid which circulates in the auxiliary circuit 326 and in the storage tank 328. It is however possible that in other embodiments, the first and the second exchanger 25 and 26 can each comprise a further tube bundle connected to the auxiliary circuit 326 independently of the hydraulic circuit 255, in a substantially like way to what is described for the heat exchange plate 24.

The refrigerating unit 30 (with the exception of the evaporator, i.e. the heat exchange plate 24) is for example arranged internally of a first parallelepiped module 300, i.e. an imaginary volume having a parallelepiped shape in which the condensation unit 20 is contained.

The second module 300, for example, is bordered by a tubular frame, for example formed by rectangular portals 301 (for example two in number which can be defined by the rectangular portals 201 themselves bordering the first module 200) parallel to one another and joined by at least four longitudinal cross-members 302 parallel to the advancement direction of the air flow imposed by the ventilator of the first module 200. For example the cross members 302 are able to join the vertices of the portals 301.

The portals 301 exhibit a vertical longitudinal axis and lie on parallel planes to the faces 241,251,261; 242,252,262 of the parallelepiped bodies 240,250,260 of the condensation unit 20.

In practice, each portal 301 delimits an interconnecting face of the second module 300, able to interconnect, as will be more fully described in the following, at least with the interconnecting face of a first module 200.

Each contiguous face to the interconnecting face (for example four in number of which two lateral, one upper and one lower) of the second module 300 can be provided with filler sheets, for example fixed sheets or mobile sheets, for example of a hatch or door type. At least one of the lateral filler sheets is advantageously openable for aspirating, by the fans 314, air from the environment surrounding the second module.

The second module 300 exhibits a width (in a perpendicular direction to the advancement direction of the air flow along the first module 200), for example defined by the extension of a horizontal side of the front portal 301, which extension is W, in which W is for example a maximum width of the internal compartment of a container of standard dimensions (for example 234 cm), for example transportable by sea.

In the example W is a little smaller than the maximum width of the internal compartment of a container of standard dimensions and preferably is substantially 220 cm.

In practice, the second module 300 exhibits a width W (in the transversal direction to the crossing direction of the first module 200 by the air flow) that is twice the width W/2 of the first module.

The length L of the first module 200, in the parallel direction to the advancement direction of the air flow along it, can be smaller than the width W.

The second module 300 and the first module 200 exhibit a same height, for example a maximum length of the internal compartment of a container of standard dimensions, for example transportable by sea.

The first module 200 and the second module 300 are joined to one another and reciprocally fixed by means of a respective interconnecting face, which are able to match substantially parallel to one another.

In practice, the interconnecting face of the first module 200 occupies a half of the surface of one of the interconnecting faces of the second module 300 to which it is fixed.

The interconnecting faces can be fixed to one another by bolts or another threaded organ and/or by means of appropriate weld seams which interconnect the longitudinal members defining the portals 201 of the first module 200 and the portals 301 of the second module 300.

The dissipating fans 314 of the condenser 312 of the refrigerating unit 30 are, for example, located on an upper contiguous face of the second module 300.

One or both the lateral contiguous faces of the second module 300 can exhibit an access opening (closable at least partially by an openable hatch) from which the ambient air drawn from the fans 314 enters).

The width of the access opening, the rotation velocity and the overall flow rate of the ventilators 23, the rotation velocity and the overall flow rate of the dissipating fan 214 are configured so as to define an air mixture substantially comprising $2/3$ of ambient air entering the second module 300 from the access opening and $1/3$ of dehumidified air entering the second module 300 by means of the ventilator 23 and exiting from the first module 200.

The apparatus 10 further comprises a purification unit 40, which is able to make the condensation water collected by the condensation unit 20 potable.

The purification unit 40 comprises a sourcing pump 41 which, by means of a tube 42, is able to collect the condensation water collected on the bottom of the collecting tub 291,292,293 and send it to a purifier 43.

The purifier 43 can be provided with one or more filters, of which for example an anti-particulate filter, an anti-bacterial filter and/or a filter for removing the organic substance that might be present in the water, an activated charcoal filter and/or other filter elements.

Further, the purifier 43 can comprise a sterilizer, for example functioning with UV rays or ozone.

Further, the purifier 43 can comprise a mineralizer, for example located downstream of the filters and suitable for adding condensation water filtered from mineral salts or other organoleptic elements.

The purifier 43 can lastly comprise a tank 44 in which the water purified by the purifier 43 is stored, which tank 44 comprises an emptying stopcock 45.

The condensation unit 20 is for example arranged internally of a first parallelepiped module 400, i.e. an imaginary volume having a parallelepiped shape in which the condensation unit 20 is contained.

The third module 400, for example, is bordered by a tubular frame, for example formed by rectangular portals 401 (for example two in number) parallel to one another and joined by at least four longitudinal cross-members 402 parallel to the advancement direction of the air flow imposed by the ventilator 23 along the first module 200. For example the cross members 402 are able to join the vertices of the portals 401.

The portals 401 exhibit a vertical longitudinal axis and lie on parallel planes to the faces 241,251,261; 242,252,262 of the parallelepiped bodies 240,250,260 of the condensation unit 20.

In practice, each portal 401 delimits an interconnecting face of the second module 400, able to interconnect, as will be more fully described in the following, at least with the interconnecting face of the second module 300.

Each contiguous face to the interconnecting face (for example four in number of which two lateral, one upper and one lower) of the third module 400 can be provided with filler sheets, for example fixed sheets or mobile sheets, for example of a hatch or door type.

For example, the emptying stopcock 45 is accessible from one of the above-mentioned contiguous faces, for example lateral.

In a first embodiment shown in figures from 1 to 9, the third module 400 exhibits a width, for example defined by the extension of a short side (horizontal) of the front portal 401 (in relation to the crossing direction of the first module 200 by the air flow), which extension is W/2, in which W is for example a maximum width of the internal compartment of a container of standard dimensions (for example 234 cm), for example transportable by sea.

As mentioned, in the example W is a little smaller than the maximum width of the internal compartment of a container of standard dimensions and preferably is substantially 220 cm.

In practice, in the first embodiment, the third module 400 exhibits a width W/2 (in the transversal direction to the crossing direction of the first module 200 by the air flow) that is equal to the width W/2 of the first module 200 and half the width W of the second module 300.

The length L of the third module 400, in the parallel direction to the advancement direction of the air flow along the first module 200, in the first embodiment, is equal to the length L of the first module 200.

The third module 400 and the first module 200 exhibit a same height, for example a maximum length of the internal compartment of a container of standard dimensions, for example transportable by sea.

In practice, in this embodiment, the first module 200 and the third module 300 exhibit a same external dimension and a same external shape.

The third module 400 and the second module 300 are joined to one another and reciprocally fixed by means of a respective interconnecting face, which are able to match substantially parallel to one another.

The interconnecting faces can be fixed to one another by bolts or another threaded organ and/or by means of appropriate weld seams which interconnect the longitudinal members defining the portals 301 of the second module 300 and the portals 401 of the third module 400.

In practice, the interconnecting face of the third module 300 occupies a half (that is, in the first embodiment, the half left free by the first module 200) of the surface of one of the interconnecting faces of the second module 300 to which the first module 200 is fixed.

A contiguous lateral face of the third module 400 is, also, fixed to a contiguous lateral face of the first module 200.

The above-mentioned contiguous lateral faces can be fixed to one another by bolts or another threaded organ and/or by means of appropriate weld seams which interconnect the cross members 202 and 402 defining the contiguous lateral faces, respectively of the first module 200 and the third module 400.

In practice, in the first embodiment, the apparatus 10 is constituted by one first module 200, one second module 300, one third module 400, fixed to one another as described above.

In a second embodiment shown in FIG. 10, in which the above-described water flow and the power of the apparatus 10 are substantially double with respect to the apparatus 10 of the first embodiment, the third module 400 exhibits a width, for example defined by the extension of a short side (horizontal) of the front portal 401 (in relation to the crossing direction of the first module 200 by the air flow), which extension is W, in which W is for example a maximum width of the internal compartment of a container of standard dimensions (for example 234 cm), for example transportable by sea.

In the example W is a little smaller than the maximum width of the internal compartment of a container of standard dimensions and preferably is substantially 220 cm.

In practice, in the second embodiment, the third module 400 exhibits a width W (in the transversal direction to the crossing direction of the first module 200 by the air flow) that is equal to the width W of the first module 300 and double the width W of the second module 200.

The length L of the third module 400, in the parallel direction to the advancement direction of the air flow along the first module 200, in the second embodiment can be less than the above-mentioned dimension W and, for example substantially equal to the length L of the second module 300.

The third module 400, the second module 300 and the first module 200 exhibit a same height, for example a maximum length of the internal compartment of a container of standard dimensions, for example transportable by sea.

In practice, in the second embodiment, the apparatus 10 is constituted by two first modules 200, two second modules 300, two third modules 400, fixed to one another as described above.

One of the second modules 300 exhibits one of the fixed interconnecting faces (as described above for the first embodiment) to the interconnecting face of each of the two first modules 200.

In practice, each interconnecting ace of a first module 200 occupies (and is fixed) to half the surface of the interconnecting face of one of the second modules 300.

The first modules 200 are fixed to one another by a respective contiguous lateral face, for example they can be fixed to one another by bolts or another threaded organ and/or by means of appropriate weld seams which interconnect the cross members 202 defining the contiguous lateral faces.

The further interconnecting face of the second module 300 opposite the face fixed to the first modules 200, is fixed to the interconnecting face of the further second module 300. The interconnecting faces of the two second modules 300 can be fixed to one another by bolts or another threaded organ and/or by means of appropriate weld seams which interconnect the longitudinal members defining the portals 301 of the second modules 300.

The further interconnecting face of the second module 300 opposite the face fixed to the second module 300, is fixed to the interconnecting face of the third module 400.

The interconnecting faces of the third module 400 and the second module 300 can be fixed to one another by bolts or another threaded organ and/or by means of appropriate weld seams which interconnect the longitudinal members defining the portals 301 of the further second module 300 and the portals 401 of the third module 400.

Each refrigerating unit 30 of each second module 300 is connected, as described in the foregoing, to each heat exchange plate 24 of one of the two condensation units 20.

In the second embodiment, a converging nozzle 230 is connected to each ventilator 23 of the condensation unit 20 more distant from the respective refrigerating unit 30 (and respect second module 300), so that the dehumidified air exiting from the first module 200 is accelerated and sent on towards the more distant second module 300.

Obviously the purification plant 40 will receive the water to be purified from each collecting tub 291,292,293 of each condensation unit 20.

In a third embodiment shown in FIG. 11, in which the above-described water flow and the power of the apparatus 10 are substantially double with respect to the apparatus 10 of the second embodiment, the third module 400 exhibits a width, for example defined by the extension of a short side (horizontal) of the front portal 401 (in relation to the crossing direction of the first module 200 by the air flow), which extension is W, in which W is for example a maximum width of the internal compartment of a container of standard dimensions (for example 234 cm), for example transportable by sea.

In practice, in the third embodiment, the third module 400 exhibits a width W (in the transversal direction to the crossing direction of the first module 200 by the air flow) that is equal to the width W of the second module 300 and double the width W of the first module 200.

The length L of the third module 400, in the parallel direction to the advancement direction of the air flow along the first module 200, in the second embodiment can be less than the above-mentioned dimension W and, for example substantially equal to the length L of the second module 300.

The third module 400 and the first module 200 exhibit a same height, for example a maximum length of the internal compartment of a container of standard dimensions, for example transportable by sea.

In practice, in the third embodiment, the apparatus 10 is constituted by four first modules 200, four second modules 300, and at least one, for example two third modules.

In this embodiment, two third modules are fixed to one another by means of a respective interconnecting face, for example by bolts or another threaded organ and/or by means of appropriate weld seams which interconnect the longitudinal members defining the portals 401 of the third modules 300

As described above in relation to the second embodiment, two respective second modules 300 are joined and fixed to both interconnecting free faces of the third modules 400 (opposite the interconnecting face joining the third modules) to faxes of which free interconnecting faces further interconnecting faces of two further second modules 300 are respectively fixed.

As described above in relation to the second embodiment, two interconnecting faces of two first modules 200 are respectively fixed to each free interconnecting surface of the second modules 300, which two interconnecting faces are fixed to one another by two contiguous lateral faces, as described in the foregoing for the second embodiment.

In practice, in the third embodiment, the apparatus 10 exhibits a symmetrical distribution of the first and second modules 200, 300 with respect to a perpendicular plane to the air flow advancement direction, along the first modules 200 and passing through the contact plane between the two third modules 400.

In this case too, each refrigerating unit 30 of each second module 300 is connected, as described in the foregoing for the second embodiment, to each heat exchange plate 24 of one of the two condensation units 20.

In the second embodiment, a converging nozzle 230 is connected to each ventilator 23 of the condensation unit 20 most distant from the respective refrigerating unit 30 (and respect second module 300), so that the dehumidified air exiting from the first module 200 is accelerated and sent on towards the most distant second module 300.

Obviously each purification plant 40 arranged in the respective third module 400 will receive the water to be purified from each collecting tub 291,292,293 of each closest condensation unit 20.

For example, the first, second and third module 200, 300, 400, once fixed reciprocally as described in the foregoing define a substantially single-block apparatus having a width W of slightly less than the maximum width of the internal compartment of a container of standard dimensions (for example 220 cm), for example transportable by sea; a height of slightly less than the maximum height of the internal compartment of a container of standard dimensions (for example 263 cm), for example transportable by sea, and having a variable length as a function of the flow rate and/or power requested, which is substantially 495 cm for the first embodiment, 905 cm for the second embodiment and 1810 cm for the third embodiment, so as to be able to be inserted in a standard container for transportation thereof.

Functioning of the Apparatus

In the normal functioning of the apparatus 10, the ventilators 23 are set in operation so as to generate a continuous air flow that crosses the condensation unit 20, in particular the heat exchange plate 24 and the heat exchangers 25 and 26.

At the same time, the compressor 310 and the condenser 312 of the refrigerating unit 30 are also set in operation, so that the evaporation of the refrigerating unit in the heat exchange plate 24 is able to cool the air flow to a lower temperature than the dew point temperature, thus causing condensing of the vapor in the air flow, which vapor accumulates in the form of water in the collecting tub 291 and is then sent on to the purification unit 40.

At the same time the recycling pump 256 is also set in operation, so as to cause the heat exchange liquid to flow internally of the closed hydraulic circuit 255 connecting the heat exchangers 25 and 26. In this way, the cold and dehumidified air flow exiting the heat exchange plate 24 cools the heat exchange liquid which is in the second exchanger 26. This cold liquid is sent upstream of the first exchanger 25 where it is heated by the air flow in inlet before returning back to the second exchanger 26. In this way, the air flow crossing the first exchanger 25 is pre-cooled before reaching the heat exchange plate 24. Owing to this pre-cooling, the air flow can be brought to a temperature equal to or near to the dew point, without using energy directly produced by the refrigerating unit 30, but simply by recuperating a part of the heat energy which otherwise would be lost in the air.

Note here that the vapor in the air flow can condensate not only in the heat exchange plate 24 but also in part in the first heat exchanger 25. The water produced in the first heat exchanger 25 accumulates in the relative collecting tub 292 and is thence also sent on to the purification unit 40.

The cold and dehumidified air flow that exits the condensation unit 20, downstream of the ventilators 23, can be conveyed into the refrigerating unit 30, so as to pass it through the condenser 312, where it can cool the refrigerating fluid in the gaseous state by means of the heat exchange plate 24, causing condensation thereof.

Alternatively, the cold and dehumidified cold air flow from the condensation unit 20, or a part thereof, can be deviated and conveyed towards other users. For example, the air flow can be used for supplying other air treatment plants and/or for supply conditioning/cooling plants of buildings or other structures.

In these and other cases, the condenser 312 of the refrigerating unit 30 can be supplied wholly or in part by a second flow of ambient air coming directly from outside the plant 10, for example entering by the access opening of the second module 300. As mentioned in the foregoing, it is preferable for a mixture of air substantially comprising ⅔ of ambient air and ⅓ of cold and dehumidified air coming from the condensation unit 20 to be made to cross the condenser 312.

With the aim of making this functioning effective, all the active components of the apparatus 10, such as for example the compressor 310, the condenser 312 and the expansion valve 310 of the refrigerating unit 30, as well as the heat exchange plate 24 and the heat exchangers 25 and 26 and the ventilators of the condensation unit 20, are generally dimensioned so as to obtain a certain water production in determined standard environmental conditions. For example, the plant 10 can be dimensioned so as to obtain about 100 liters of water per hour, in standard atmospheric conditions, i.e. with ambient air at temperatures of about 30° C. and relative humidity at about 70%.

In order to obtain these performances in standard atmospheric conditions, the refrigerating unit 30 can be made to function so that the saturated vapor temperature of the refrigerating fluid is about 5.5° C. (at the compressor 310 inlet), while the ventilators 23 of the condensation unit 20 can be made to function at a predefined velocity able to generate an air flow of about 8000 m³/h.

During the above-described functioning, the apparatus 10 can also be used to heat the vector fluid which circulates in the auxiliary circuit 326, which (as mentioned) can in turn be used internally of a heating plant or as hot sanitary water.

In this case, the intercept valve 324 and possibly the intercept valve 325 is regulated so that the refrigerating fluid at high temperature coming from the compressor 310 can flow into the second condenser 321. In particular the refrigerating fluid can be entirely deviated into the second condenser 321, completely bypassing the condenser 312. In this way, a total recuperation of the condensation heat generated by the preceding compression of the refrigerating fluid is obtained in the second condenser, which heats the vector fluid of the auxiliary circuit 326.

As mentioned in the foregoing, the hot vector fluid obtained in the second condenser 321 might be used for defrosting the heat exchange plate 24 and, for example, also the heat exchangers 25 and 26. This need can be manifested when the plant 10 is used for production of water starting from air having a dew point temperature of less than 0° C. In these climatic conditions, as the air condensation point is lower than the water freezing point, ice can be directly obtained which progressively accumulates on the tubes of the tube bundle 244 of the heat exchange plate 24. In these cases, while the apparatus 10 functions to produce water/ice, the refrigerating fluid coming from the condenser 310 is deviated into the second condenser 321, so as to heat the vector fluid in the storage tank 328. By opening appropriate valves in the auxiliary circuit 326, the vector fluid accumulated can then be cyclically sent to the tube bundle 330 which is internal of the heat exchange plate 24, obtaining thawing of the ice and therefore the production of water which accumulates in the respective collecting tub 291,292, 293. In particular, the frequency with which the hot vector fluid is sent to the tube bundle 330 can be regulated by a central control unit on the basis of the temperature of the air flow in outlet from the condensation unit 20.

As with the reduction of the air temperature it is progressively more difficult to thaw the ice, this operation can be accelerated and made more efficient, enabling the hot vector fluid of the storage tank 328 to circulate also in the hydraulic circuit 255, so that the heat exchangers 25 and 26 in fact become heating elements that effectively aid the thawing of the ice.

The invention as it is conceived is susceptible to numerous modifications, all falling within the scope of the inventive concept.

Further, all the details can be replaced with other technically-equivalent elements.

In practice the materials used, as well as the contingent shapes and dimensions, can be any according to requirements, without forsaking the scope of protection of the following claims.

What is claimed is:

1. A modular apparatus (10) for water production from atmospheric air which comprises:
    a first parallelepiped module (200) provided with an inlet opening (21) for moist air, an outlet opening (22) of the dehumidified air, a ventilator (23), configured such as to force an air flow to cross an internal volume of the first module (200) from the inlet opening (21) to the outlet opening (22), a condensation unit (20), located internally of the first parallelepiped module (200) so as to intercept the air flow, and a collecting tub (291, 292, 293) located inferiorly of the condensation unit (20) for collecting condensation water that is separating from the air flow; and
    a second parallelepiped module (300) in which a refrigerating unit (30) is contained, provided with at least a portion of a refrigerating circuit (31) in which a cooling fluid circulates, and an evaporator, which is contained in the first parallelepiped module (200), in which the cooling fluid evaporates so as to cool the air flow internally of the condensation unit (20);
    wherein the first parallelepiped module (200) and the second parallelepiped module (300) are fixed to one another at a respective interconnecting face and wherein the second parallelepiped module (300) exhibits a side of the interconnecting face having a width (W) that is twice a width (W/2) of a side of the interconnecting face of the first parallelepiped module (200).

2. The apparatus (10) of claim 1, wherein the outlet opening (22) is arranged at the interconnecting face of the first parallelepiped module (200) and the inlet opening (21) is made at an opposite face of the interconnecting face of the first parallelepiped module (200).

3. The apparatus (10) of claim 1 further comprising a third parallelepiped module (400) in which a water purification unit (40) of the condensed water is contained, configured so as to collect the condensed water from the collecting tube (291, 292, 293), wherein the third parallelepiped module (400) and the second parallelepiped module (300) are fixed to one another at a respective interconnecting face and wherein the second parallelepiped module (300) exhibits the side of the interconnecting face having the width (W) that is twice the width (W/2) of the side of the interconnecting face of the third parallelepiped module (400).

4. The apparatus (10) of claim 3, wherein a contiguous face to the interconnecting face of the third parallelepiped module (400) is provided with a side exhibiting a length (L) equal to a length (L) of a side of a contiguous face to the interconnecting face of the first parallelepiped module (200), the first parallelepiped module (200) and the second parallelepiped module (300) being reciprocally flanked and fixed by means of the respective contiguous faces.

5. The apparatus (10) of claim 3, wherein the water purification unit (40) comprises an anti-particulate filter and a mineralizer.

6. The apparatus (10) of claim 3, wherein the water purification unit (40) comprises a sterilizer.

7. The apparatus (10) of claim 1 further comprising a third parallelepiped module (400) in which a water purification unit (40) of the condensed water is contained, configured so as to collect the condensed water from the collecting tube (291, 292, 293), wherein the third parallelepiped module (400) and the second parallelepiped module (300) are fixed to one another at a respective interconnecting face and wherein the second parallelepiped module (300) exhibits a side of the interconnecting face having a width (W) that is equal to a width (W) of a side of the interconnecting face of the third parallelepiped module (400).

8. The apparatus (10) of claim 7, further comprising a pair of the first parallelepiped modules (200) flanked and fixed reciprocally via a respective contiguous face to the interconnecting face, respectively fixed to the interconnecting face of a second parallelepiped module (300) of a pair of the third parallelepiped modules (400) fixed to one another via an opposite face with respect to the respective interconnecting face.

9. The apparatus (10) of claim 7 further comprising two pairs of first parallelepiped modules (200) and two pairs of second parallelepiped modules (300), wherein the inlet openings (21) of the first parallelepiped modules (200) of a first pair of first parallelepiped modules (200) are symmetrically opposite the inlet openings (21) of the first modules of the second pair of first parallelepiped modules (200).

10. The apparatus of claim 8, wherein the refrigerating unit (30) of each of the second parallelepiped modules (300) is provided with a respective branch tube or conduit configured to cross a respective condensation unit (20) located in a first parallelepiped module (200) of the first parallelepiped modules.

11. The apparatus (10) of claim 8, wherein the outlet openings (22) of the pair of the first parallelepiped modules (200) comprises an accelerator element (230) of the dehumidified air flow which exits from the outlet opening.

12. The apparatus (10) of claim 8, wherein a pair of heat exchangers (25,26), of which a first heat exchanger (25) and a second heat exchanger (26), are contained in each first parallelepiped module (200), respectively located upstream and downstream of the condensation unit (20) in the crossing direction thereof by the air flow, the pair of heat exchangers (25,26) being connected by means of a hydraulic circuit (255) comprising a recycling pump (256) of a liquid contained in the hydraulic circuit (255).

13. The apparatus (10) of claim 1, wherein the cooling fluid circulates into the refrigerating circuit (31) in a circulating direction, the refrigerating circuit (31) further comprising:
a cooling fluid compressor (310) actuated by a motor (311),
a cooling fluid condenser (312) located downstream of the compressor (310) in the circulating direction,
an expansion valve (319) located downstream of the condenser and upstream of the evaporator in the circulating direction.

14. The apparatus (10) of claim 13, wherein the condensation unit (20) is the evaporator of the refrigerating circuit.

15. The apparatus (10) of claim 13, wherein the cooling fluid condenser (312) comprises a dissipating fan (314) located on an upper face of the second parallelepiped module (300), and wherein a lateral face of the second parallelepiped module (300), which is adjacent to the interconnecting face thereof has an access opening for atmospheric air.

16. The apparatus (10) of claim 15, wherein a size of the access opening, the ventilator (23) and the dissipating fan (314) are configured so as to have an air mixture entering the second parallelpiped module (200), wherein two-thirds of a volume of the air mixture is constituted by atmospheric air entering the second parallelepiped module (300) from the access opening and one-third of the volume of the air mixture is constituted by dehumidified air entering the second parallelepiped module (300) by means of the ventilator (23).

17. The apparatus (10) of claim 13, wherein the motor (311) is an electric motor.

18. The apparatus (10) of claim 1, wherein the first parallelepiped module (200) is provided with a filter apparatus (27) configured to be crossed by the moist air flow which enters the inlet opening (21).

* * * * *